No. 863,048. PATENTED AUG. 13, 1907.
E. J. WOODHOUSE.
MEANS FOR LOCKING OR BRAKING THE WHEELS OF PIT TRAMS.
APPLICATION FILED FEB. 9, 1907.

Witnesses.
Percy M. Goodwin.
Robt. Hunter

Inventor.
Ernest Joseph Woodhouse
by His Attorney.

UNITED STATES PATENT OFFICE.

ERNEST JOSEPH WOODHOUSE, OF ILKESTON, ENGLAND.

MEANS FOR LOCKING OR BRAKING THE WHEELS OF PIT-TRAMS.

No. 863,048.　　　　　Specification of Letters Patent.　　　　　Patented Aug. 13, 1907.

Application filed February 9, 1907. Serial No. 356,592.

*To all whom it may concern:*

Be it known that I, ERNEST JOSEPH WOODHOUSE, a subject of the King of Great Britain and Ireland, and a resident of 16 Brook street, Ilkeston, in the county of Derbyshire, England, have invented a certain new and useful Improvement in Means for Locking or Braking the Wheels of Pit-Trams or other Wagons, of which the following is a specification.

This invention relates to the locking or braking of wheels of pit trams and other wagons and has for its objects:—(1) the prevention of accidents arising through the breaking of haulage ropes and the consequent running away of the trams, corves, trolleys or other wagons; (2) dispensing with the cumbersome and dangerous use of handlockers in mines and other places; (3) the secure locking or braking of trams, corves, trolleys, wagons or the like when stationary, either on the rails or on the pit winding cage.

For this purpose the invention consists essentially of a ratchet, toothed or cogged wheel, rigidly fixed midway of the length of the axle or axles of the wagon or the like, located in a longitudinal slot in a slide bar or bars extending the full length of the wagon or the like, and terminating exterior thereof in an eye adapted to receive the end of the haulage rope or the like. These slides or bars interior of the frame of the wagon or the like are provided with a cross piece having an arm or equivalent extending beyond the outer frame, provided with holes for the insertion therein of pins, which, on the removal thereof, permit the slotted bars or slide, under the action of a spring or springs, to engage with and between two adjacent teeth of the aforesaid ratchet, toothed or cogged wheels, thereby effectually locking the axle, and consequently braking or locking the wheels thereon. The aforesaid slides or bars act independently of one another, and admit of one or both being put into operation at the same time, thereby producing, in fact, an emergency brake; so that on a four-wheel wagon or the like, the two fore wheels may be locked while the rear are free, or vice versa; further, when the wagon or the like is not in use, all the wheels become automatically locked, thus preventing any movement of the wagon or the like.

In order that the said invention may be readily understood reference is to be had to the following description and accompanying sheet of drawings in which:—

Figure 1:
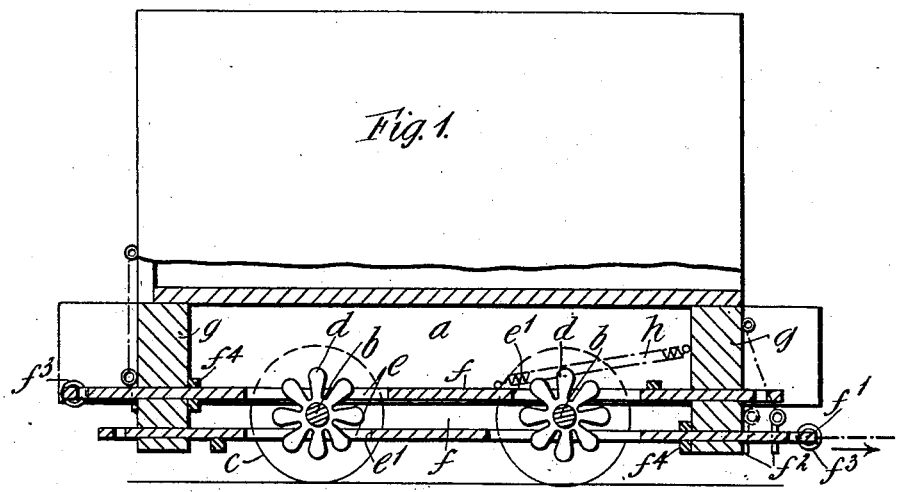
Figure 2:
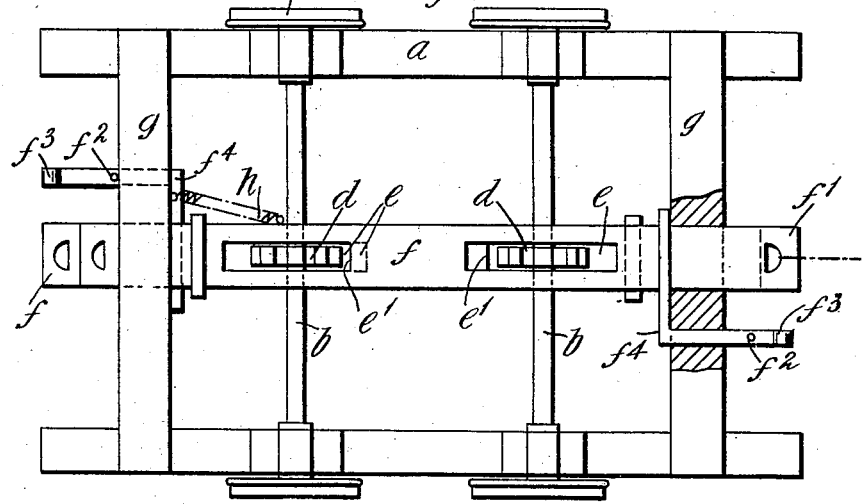

Figure 1 is a longitudinal section of a wagon, haulage being applied to the front end thereof; Fig. 2 is an underside plan view thereof; and, Fig. 3 a longitudinal section of a wagon, but with haulage or tension broken.

Like letters of reference indicate corresponding parts in the several views.

Referring to the drawings, $a$ represents the frame of the wagon or the like, and $b$ the usual axles and $c$ the wheels fast thereon. Midway of the wheels $c$ and on the axles thereof are arranged the ratchet, toothed or cogged wheels $d$, the same working within the slots $e$ of the slide bars $f$, working in the ends $g$ fore and aft of the wagon frame. Connected to said slide bars and the frame are the springs $h$ tending always to bring the ends of the slots $e$ of the bars $f$ into engagement with the ratchet, toothed or cog wheels $d$.

Figure 3:
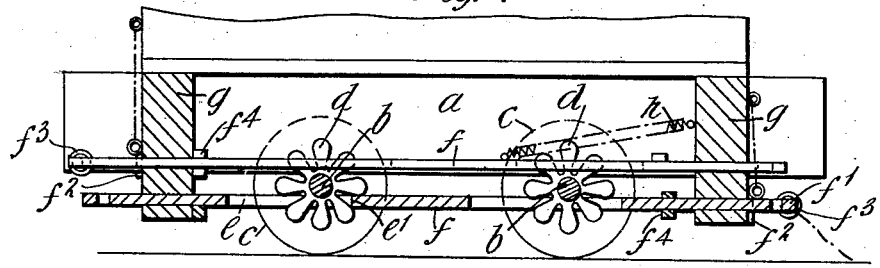

In use, on haulage being applied to the front end $f'$ of the lower slide bar $f$, (the pins $f^2$ in the arms $f^3$ of the cross bars $f^4$ being in the position shown in Figs. 1 and 2, viz:—leaving said lower slide bar $f$ free to move forward and upper bar locked against movement) the slots $e$ in said lower bar are drawn clear of the teeth of the wheels $d$ fast on the axles $b$ leaving the same free to rotate; but immediately tension on the haulage rope is withdrawn or on the breakage of the same the lower slide $f$ flies back under the action of the spring $h$, thereby causing the end $e'$ of the rear slot $e$ to engage with and between two adjacent teeth of the rear ratchet, tooth or cogged wheel $d$ so automatically locking or braking the rear wheels, see Fig. 3. If from any cause, such, for instance, as the breaking of the spring $h$—the lower slide fails to act, then by manually knocking out the pin $f^2$ of the upper slide $f$, the same is drawn forward thereby engaging the end $e'$ of its forward slot $e$ with the wheel $d$ on the front axle $b$ so locking the same.

Haulage of the wagon or the like in the opposite direction is effected by keeping the lower slide $f$ drawn out as in Fig. 1, by shifting its pin $f^2$ to position shown in dotted lines, and then withdrawing pin $f^2$ from the rear end of upper slide $f$ so that as long as a pull is exerted on rear end of said upper slide, the wheels $d$ are clear of the slot; but on the pull slackening, then the said upper slide under the action of its spring $h$, moves forward, bringing the end $e'$ of its forward slot $e$ into engagement with the wheel $d$, thereby locking the front axle and its wheels, braking or locking of rear wheels in emergency being attained by removing pin $f^2$ from the lower slide, permitting same to move back into engagement with the rear wheel or ratchet $d$. By removing both pins the lock can be applied simultaneously on both axles.

Having now described my invention what I claim as new and desire to secure by Letters Patent of the United States is:—

As a means for effecting the locking or braking of a wheeled vehicle, spring-controlled upper and lower slides working in the end frame of the vehicle, slots in said slides, ratchet wheels, fast on the axles of said vehicle, working in said slots, and adapted, on the breakage of the haulage rope or removal of tension, to be engaged with by the ends of said slots, under the action of said springs, substantially as described and illustrated.

In testimony whereof I have affixed my signature in presence of two witnesses.

ERNEST JOSEPH WOODHOUSE.

Witnesses:
　EDWIN TRUMAN,
　SAMUEL ADAMS.